Patented Oct. 17, 1933

1,931,150

UNITED STATES PATENT OFFICE 1,931,150

SAND CONDITIONER

Roy H. McElroy and Louis Robert Pape, Dayton, Ohio, assignors to Herbert S. Simpson, Chicago, Ill.

Application February 1, 1932. Serial No. 590,086

5 Claims. (Cl. 83—45)

This invention relates to mullers.

It is the object of the invention to provide a muller construction in which the degree of vertical movement of the muller can be limited to different degrees depending upon the material being mulled while the mullers are rotating on their own axes and bodily about the central axis.

It is a further object to provide a series of cooperating scrapers adapted to throw the material being mulled and to turn the material and to operate in different zones of the material so as to move the material constantly in the path of the mullers where it is mulled.

It is a further object to provide such scrapers in such a position with such an adjustment that they may be quickly and easily replaced without interfering with the rest of the mechanism.

It is a further object to provide a muller pan having a removable bottom so arranged that it may be removed in sections and such removal and replacement be effected with the minimum of disturbance of the mulling mechanism.

Referring to the drawings.

Figure 1:
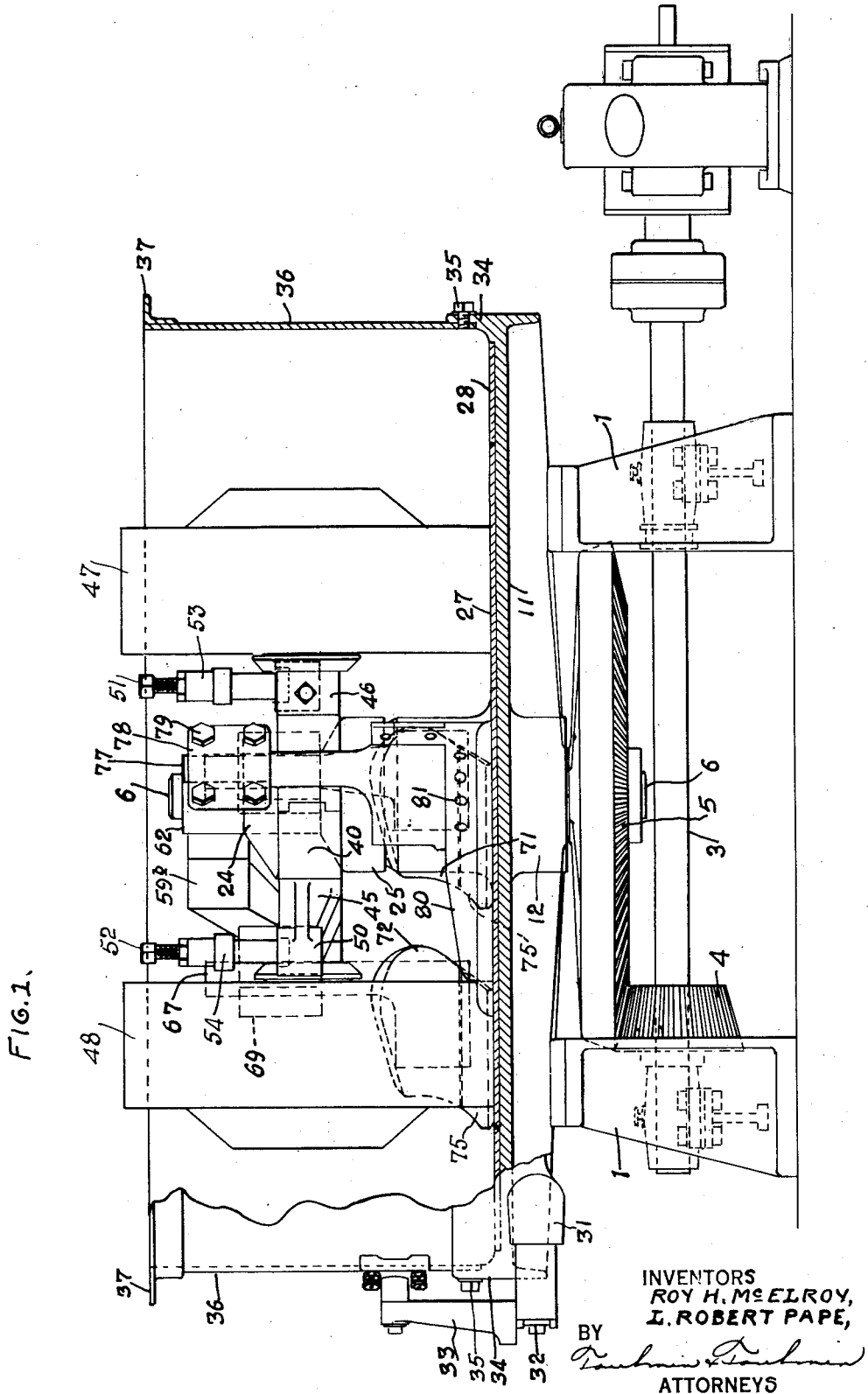
Figure 1 is a side elevation of the muller with the pan partially in section and the side walls partially broken away.
Figure 2:
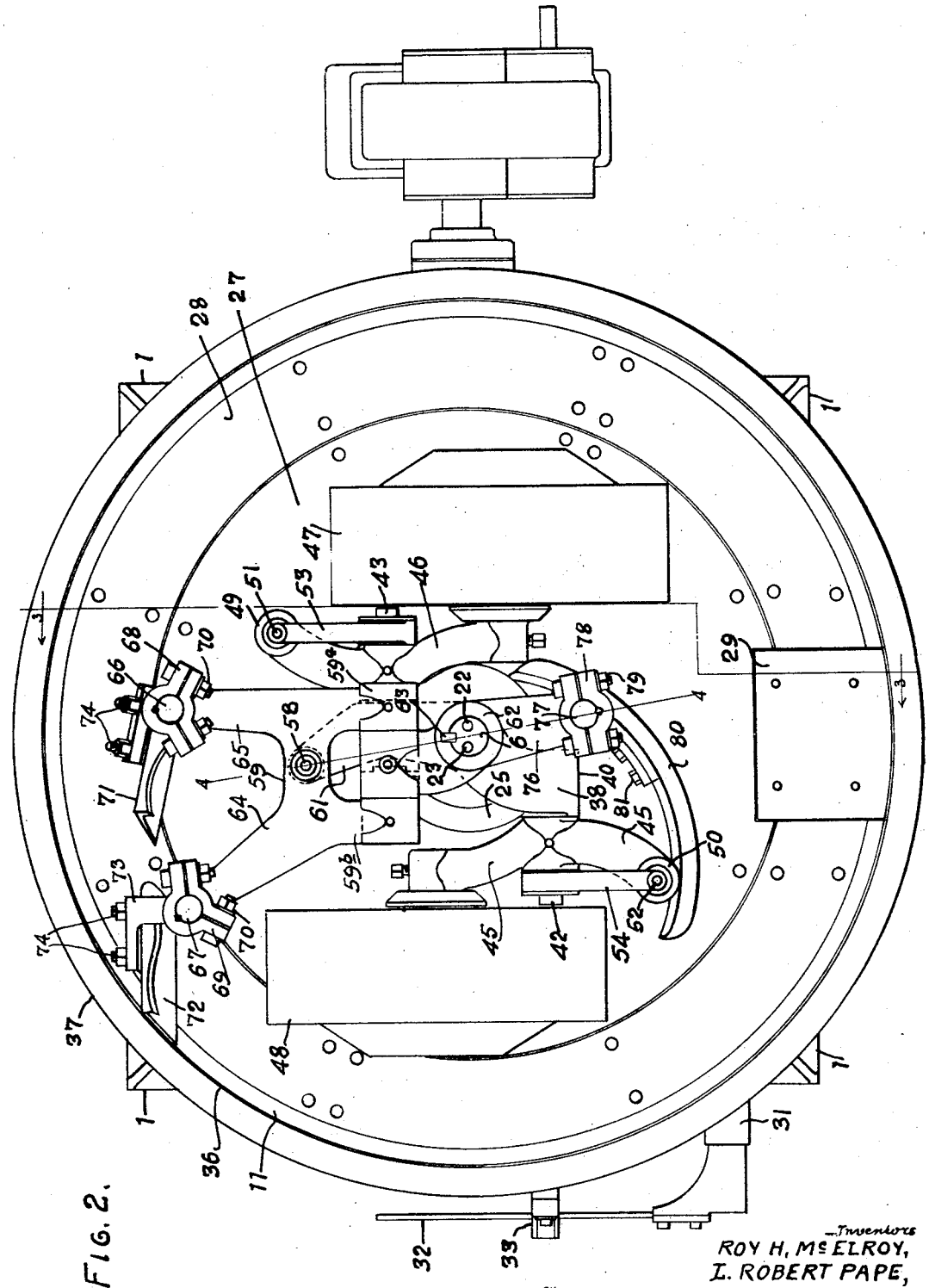
Figure 2 is a top plan view of the muller.
Figure 3:
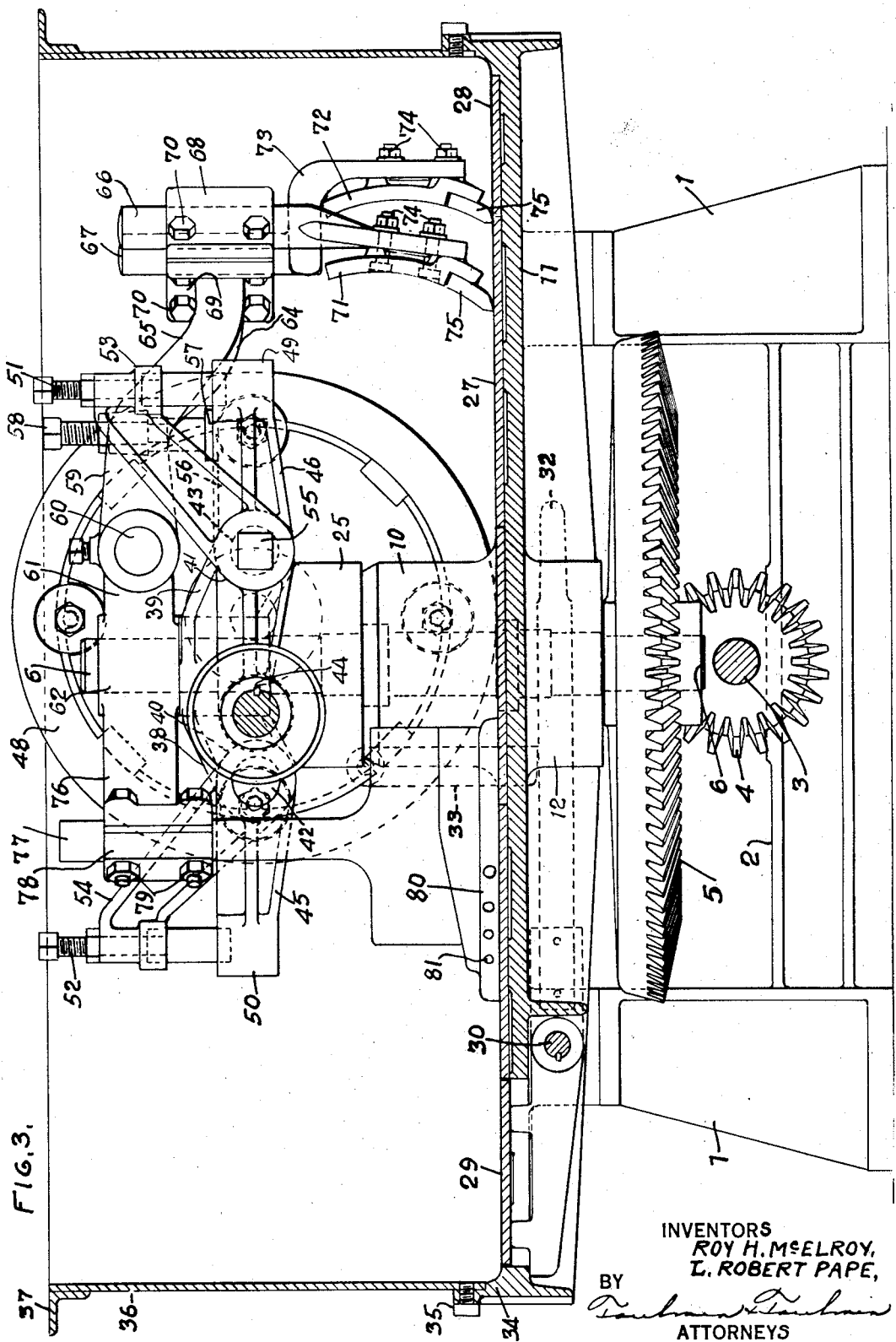
Figure 3 is a section on the line 3—3 thereof.
Figure 4:
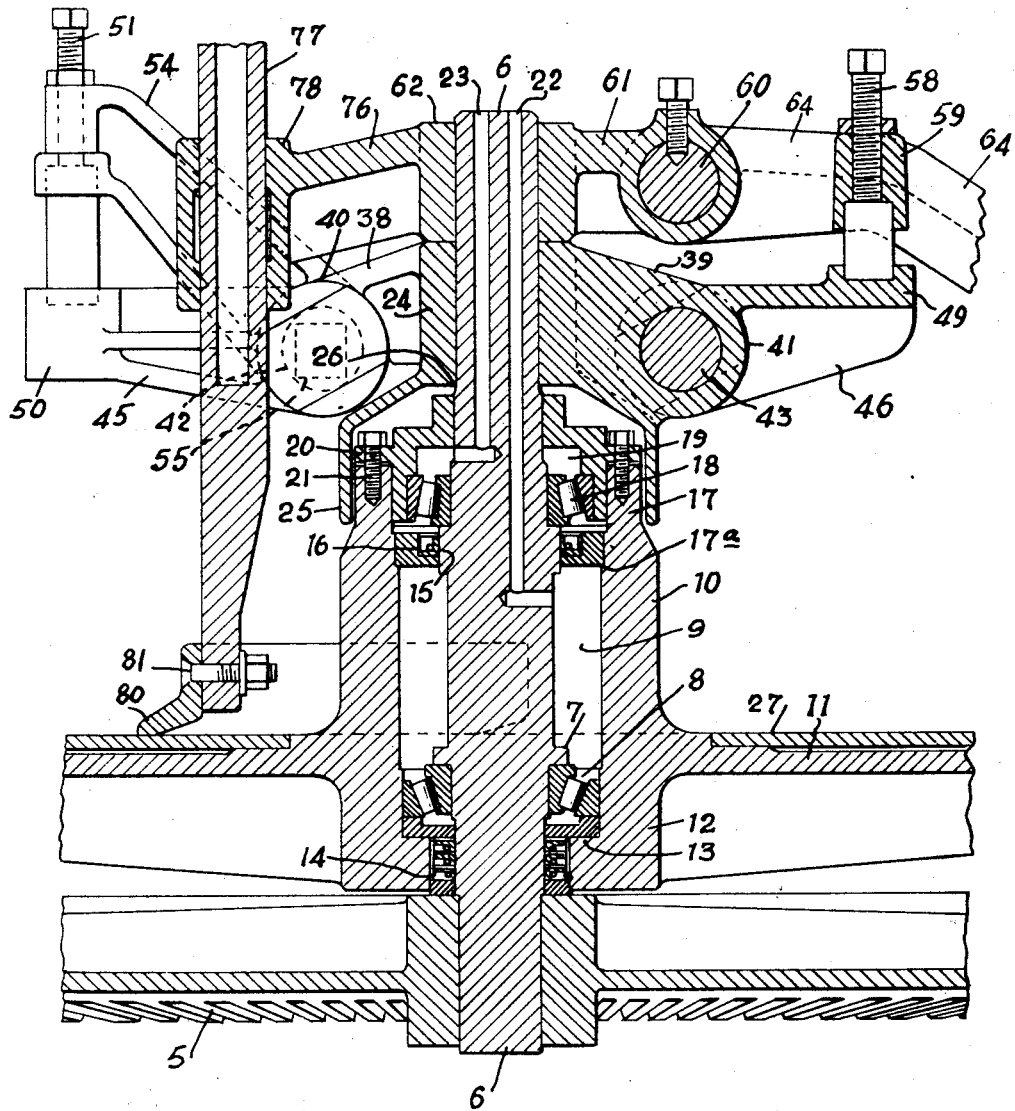
Figure 4 is a section on the line 4—4 of Figure 2 showing the particular construction of the muller shaft.

Referring to the drawings in detail, 1—1 indicate legs joined together by the cross members 2 which support the driving shaft 3 which carries the driving pinion 4 engaging the master driving gear 5 which is attached to the central column shaft 6. This shaft is provided with a shoulder 7 so that it rests upon the roller bearings 8, which roller bearings are in turn supported within the chamber 9 formed by the central, upwardly-extending column 10 that is an integral part of the base 11 forming the bottom of the muller pan. A depending collar 12 is integrally formed on this bottom 11 and has an inwardly-extending shoulder 13 on which rests the bearing 8. Within this collar 13 is a lubricant seal or packing 14.

The column 6 is provided with a second upper spaced shoulder 15 around the margin of which is a second lubricant seal 16 carried on the collar 17 of the column 10. On the top of the shoulders 15 is a second roller bearing 18 which is supplied with lubricant from the lubricant chamber 19 formed by the cap 20 which is bolted by the bolts 21 on top of the column 10.

The chamber 9 is supplied with lubricant through the lubricant passageway 22 in the shaft 6 and the chamber 19 is supplied with lubricant through the lubricant passageway 23 in the shaft 6. The collar 17, which rests upon the shoulder 17a of the column 10, acts as a barrier or partition between the two chambers 9 and 19.

In order to further protect the bearings, there is provided an external collar or sleeve 24 having an outwardly and downwardly extending skirt 25. This sleeve is supported on the shoulder 26 on the shaft 6 and extends downwardly, outwardly and over the cap 20.

The muller pan, which is provided with the base 11 has an annular, central, detachable wear plate or plates 27 and external, sectional, annular wear plates 28. The bottom of the pan 11 is provided with a swinging door 29 which is mounted upon the shaft 30, which shaft is pivoted in the sleeve 31 on the bottom of the muller pan 11. The shaft is actuated by the hand lever 32 which may be retained in position by the latch 33.

Returning to the muller pan, it will be observed that the bottom 11 is provided with an external flange 34 which is bolted by the bolts 35 to a side wall structure consisting of the sheet 36 having an upper reinforcing flange 37.

Returning to the sleeve 24, it will be observed that it is provided with oppositely-extending arms 38 and 39 having eyes 40 and 41 in the ends thereof carrying the shafts 42 and 43 which are keyed by keys 44 to the arms 38 and 39. Mounted on each of these shafts is one end of one of the muller arms 45 and 46 carrying the mullers 47 and 48 on the outer ends thereof. The other ends of the arms 45 and 46 have pad ends 49 and 50 respectively which are engaged by the adjusting screws 51 and 52 carried in the stationary arms 53 and 54 which are mounted on the square ends 55 of the shafts 42 and 43 respectively. In other words, the arms 45 and 46 freely rotate on their shaft supports while the arms 53 and 54 are rigidly mounted on those arms and through their adjusting screws 51 and 52 as limiting means for limiting the extent of rocking of the arms 45 and 46 on said shafts and therefore limit the rocking of the muller wheels 47 and 48.

The entire muller wheel supports and adjusting mechanism are therefore carried on the collar 24.

Also mounted on the collar 24 is a horizontallyextending arm 56 having a pad surface 57, such arm being known as the stop arm for the rocking scrapers. This stop arm is engaged on its pad 57 by the adjusting limiting screw 58 which is carried in the rocking scraper supporting arm 59 that is pivoted on the shaft 60 carried in the outer end of the scraper supporting bracket 61 which is integrally formed on the collar 62 that is superimposed on the collar 24 on the shaft 6 and is held against rotation on that shaft by the key 63. This arm 59 is bifurcated having inner spaced ends 59a and 59b and outer diverging arms 64 and 65, which respectively carry the vertically-disposed scraper supports 66 and 67 which are attached to the arms by the clamps 68 and 69 and bolts 70.

The support 66 carries the scraper 71 and the arm 67 carries the scraper 72. The scraper 72 is closer to the periphery of the pan, due to the laterally-extending portions 73 of the support 67. Both scrapers 71 and 72 are adjustably mounted on their supports by the bolts 74 and each of them has removable scraping edges 75.

The sleeve 62 carries another arm 76, to the free end of which is attached a scraper support 77 clamped thereto with the clamp 78 and bolts 79. This scraper support carries the scraper 80 through the bolts 81.

It will be noted that the scraper just mentioned is disposed from a point adjacent the column 10 to a point half way across the face of one of the mullers. The other two scrapers 71 and 72 are located on the opposite sides of the shaft 6. The outer scraper 72 engages the side wall of the pan or closely adjacent to it while the scraper 71 is within the scraper 72 and covers a zone on the bottom of the pan adjacent to the zone covered by the scraper 71. The sand or other material being mulled is thus subjected to scraping action and to the turning action of the scrapers throughout its entire body and the sand is being constantly moved into the path of the mullers and new faces of the sand particles are being presented to the mulling surfaces, while the mullers themselves not only can engage the sand but can ride over any portions of the sand that cannot be otherwise satisfactorily mulled. The extent of this vertical movement of the mullers is limited by the set screws 51 and 52. Likewise, the scrapers 71 and 72 are permitted rocking vertical movement limited by the set screw 58.

The gate 29 being located on the outer portion of the pan where the sand that has been completely mulled will be thrown by the movement of the muller and centrifugal force is thus in position to receive and permit the exit of that portion of the sand that has been completely treated. The scrapers 71 and 72 cooperate for that purpose and facilitate the discharge of such sand through the opening 29. By this cooperation between the scrapers and the mullers the completed sand can be discharged at intervals without disturbing the sand interiorly located which may not have been fully completed in its treatment or which has not yet had time for its being discharged.

It will be understood that I desire to comprehend within my invention such modifications as may be necessary to adapt it to varying conditions and uses.

Having thus fully described our invention, what we claim as new and desire to secure by Letters Patent, is:

1. In a muller, a pan, a central driving shaft, a plurality of supporting members extending from said driving shaft, shafts mounted in each supporting member, muller wheels, means mounted on each shaft for supporting a muller wheel, said supporting means consisting of arms extending on both sides of said shaft, one of said arms having means for mounting a muller wheel, a stationary member extending on the opposite side of the shaft of said muller supporting arm and in a position above said other arm, and said other arm having at least a portion in alignment with said stationary member and being so located as to contact with said stationary member for limiting vertical movement of said muller wheel.

2. In a muller, a pan, a central driving shaft, a plurality of supporting members extending from said driving shaft, shafts mounted in each supporting member, muller wheels, means mounted on each shaft for supporting a muller wheel, said supporting means consisting of arms extending on both sides of said shaft, one of said arms having means for mounting a muller wheel, a stationary member extending on the opposite side of the shaft of said muller supporting arm and in a position above said other arm, said other arm having at least a portion in alignment with said stationary member and being so located as to contact said stationary member for limiting vertical movement of a muller wheel, and adjustable means mounted on said supporting means for adjusting the limits of vertical movement of said muller wheels.

3. In a muller, a muller pan having a shaft support with a chamber therein, a lower and an upper thrust bearing in the chamber, a driving shaft extending upwardly therethrough engaging the lower thrust bearing in the chamber, and the upper thrust bearing in the chamber, an imperforate cap on the chamber forming a sealing connection therewith, said cap having means for supporting the outer raceway of the upper thrust bearing, means between said bearings for dividing the chamber into upper and lower portions, means in said shaft for delivering lubricant through the shaft through the top thereof to the respective portions of the chamber, a sleeve mounted on said shaft and spaced from said cap, said sleeve having means for supporting a plurality of mullers, and a skirt extending downwardly from said sleeve below the bottom of said cap for preventing the entrance of foreign material to said chamber between said cap and chamber, and between said cap and said shaft.

4. In a muller, a muller pan having a shaft support with a chamber therein, a lower and an upper thrust bearing in the chamber, a driving shaft extending upwardly therethrough engaging the lower thrust bearing in the chamber, and the upper thrust bearing in the chamber, an imperforate cap on the chamber forming a sealing connection therewith, said cap having means for supporting the outer raceway of the upper thrust bearing, means between said bearings for dividing the chamber into upper and lower portions, a sleeve mounted on said shaft and spaced from said cap, said sleeve having means for supporting a plurality of mullers, and a skirt extending downwardly from said sleeve below the bottom of said cap for preventing the entrance of foreign material to said chamber between said cap and chamber, and between said cap and said shaft.

5. In a muller, a muller pan having a shaft support with a chamber therein, a lower and an upper thrust bearing in the chamber, a driving shaft extending upwardly therethrough engaging the lower thrust bearing in the chamber, and the upper thrust bearing in the chamber, and an imperforate cap on the chamber forming a sealing connection therewith, said cap having means for supporting the outer raceway of the upper thrust bearing, a sleeve mounted on said shaft and spaced from said cap, said sleeve having means for supporting a plurality of mullers, and a skirt extending downwardly from said sleeve below the bottom of said cap for preventing the entrance of foreign material to said chamber between said cap and chamber, and between said cap and said shaft.

ROY H. McELROY.
LOUIS ROBERT PAPE.